United States Patent

[11] 3,559,581

| [72] | Inventors | Roman Kriz<br>Vlasim;<br>Josef Hrdina, Rimovice; Josef Svejda,<br>Vlasim, Czechoslovakia |
|---|---|---|
| [21] | Appl. No. | 781,551 |
| [22] | Filed | Dec. 5, 1968 |
| [45] | Patented | Feb. 2, 1971 |
| [73] | Assignee | Blanicke strojirny narodni podnik<br>Vlasim, Czechoslovakia<br>a firm<br>Continuation-in-part of application Ser. No.<br>592,586, Nov. 7, 1966, now abandoned |

[54] METHOD OF MANUFACTURE OF THIN-WALLED PLASTIC SHELL CASINGS
2 Claims, 7 Drawing Figs.

[52] U.S. Cl. .................................................. 102/43,
18/42; 27/1.3
[51] Int. Cl. .................................................. F42b 9/30
[50] Field of Search .................................................. 102/43,
43P, 38, 42, 42C, 44; 29/1.3; 18/5, 26, 34, 42

[56] References Cited
UNITED STATES PATENTS

| 1,187,464 | 6/1916 | Offutt .......................... | 102/44 |
| 1,605,655 | 11/1926 | Du Pont ...................... | 102/43(P) |
| 2,684,502 | 7/1954 | Paulve ........................ | 29/1.3X |

FOREIGN PATENTS

| 68,278 | 11/1957 | France ........................ | 102/43(P) |
| 1,082,088 | 6/1954 | France ........................ | 102/43P |
| 1,095,837 | 12/1954 | France ........................ | 102/43P |
| 735,061 | 7/1955 | Great Britain ............... | 102/43P |
| 355,716 | 10/1961 | Switzerland ................. | 102/43P |

Primary Examiner—Robert F. Stahl
Attorney—Arthur O. Klein

ABSTRACT: A method for manufacturing plastic shell casings having relatively thin-walled tubular bodies. The tubular bodies of the shell casings manufactured in accordance with the method of this invention have cylindrical walls and a bottom which is integral with said cylindrical walls. The outer bottom edge of the shell casing has a rim member which extends downwardly therefrom. Cumulative liquid polymer plastic distribution means are mounted at the bottom of a mold having a shape corresponding to that of the finished plastic shell casing and inject liquid polymer plastic material into the mold by means of the slit injection molding technique.

PATENTED FEB2 1971  3,559,581

INVENTORS:
Roman KRIZ
Josef HRDINA
BY: Josef SVEJDA
Arthur O. Klein
their ATTORNEY

PATENTED FEB 2 1971 3,559,581

INVENTORS:
Roman KRIZ
Josef HRDINA
BY: Josef SVEJDA their ATTORNEY

METHOD OF MANUFACTURE OF THIN-WALLED PLASTIC SHELL CASINGS

RELATED APPLICATION

This application is a continuation-in-part of applicants' copending application Ser. No. 592,586, filed on Nov. 7, 1966, and entitled "Thin-walled Plastic Shell Casing with Fitting and Process of Manufacture of Same."

BACKGROUND OF THE INVENTION

It is known to manufacture casings for buckshot cartridges for shotguns, cartridges for long-range shooting devices, cartridges for signal pistols and other types of ammunition out of cardboard or paper by winding sheets of the aforelisted materials. It is also known to manufacture such shell casings out of light metal alloys or plastic materials. The manufacture of such known types of shell casings is relatively costly because it entails a complicated manufacturing process. The manufacturing process for making shell casings out of paper is particularly costly because it entails rolling the paper, glueing it, drying the exterior layer of the paper, drawing it through calibrating devices, cutting it, connecting the tubular portion on of the shell casing to the bottom portion, and finally assembling the shell casing made out of paper and the metal fitting which is mounted thereon. These shell casings made out of paper or cardboard have a tendency to tear when the cartridge is being detonated and also are liable to be damaged during handling of the cartridges.

It is also known in the art to manufacture shell casings made out of plastic material. This type of shell casing is superior to the shell casings made out of cardboard or paper because, as is well known, the plastic material is more moisture resistant and has a greater load resistance than cardboard or paper. One of the most common methods used for producing plastic shell casings is the well-known cold flow pressing technique, which uses a plastic blank which is pressed into the shape of the plastic shell casing. Another well-known method for producing plastic shell casings utilizes the continuous flow pressing technique in which a cylindrical blank is pressed into the shape of a shell casing and is calibrated and cut. The latter method has the drawback of requiring a complicated multistage method for assembling the various parts of the shell casing which are separate in intermediate stages of the overall process. Thus, the casing bottom, walls and metal fitting are produced separately and, consequently, these three parts must be combined by means of separate production steps.

SUMMARY OF THE INVENTION

The drawbacks of the aforedescribed methods are overcome in the method of manufacturing plastic shell casings in accordance with this invention, wherein the shell casing constitutes an intermediate product of a cartridge, which constitutes the end product. The plastic shell casing manufactured in accordance with this invention will not tear even during detonation of the cartridge, and the metal fitting will also not be torn off during detonation. Furthermore, the construction of the shell casing in accordance with this invention, will also resist failures due to fatigue of the plastic material (a decomposition of the molecular change will not occur). The connection of the pressure-shaped plastic blank with the metal fitting is effected with the aid of an annular integral projection of the shell casing which engages them the metal fitting, thereby resulting in a simple but very effective connection between the two pieces. The risk of the metal fitting being torn off from the plastic shell casing during detonation is therefore virtually eliminated. The bottom of the shell casing in accordance with this invention is provided with stiffening and locking ribs that are integral with the shell casing bottom. These ribs firmly support the ignition cap in the casing bottom and thus provide a stable support against the gas pressure which forms during detonation.

The method according to this invention includes the step of thermoplastically forming the plastic shell casing in a mold of suitable shape. A liquid polymer plastic of suitable character is introduced into the mold via the bottom surface thereof through a cumulative distribution member by means of the slit injection molding technique. By means of this technique, the liquid polymer plastic is uniformly distributed in a radial direction and flows through an annular slit into the cavity of the mold. The liquid plastic thus flows linearly and uniformly distributes itself in the mold cavity, thereby resulting in a very strong and uniform shell casing.

The production method of this invention includes steps of forming the shell casing from liquid copolymer plastic with gradual cooling of the formed shell casing in the mold; the shape of the casing corresponds to the shape of said mold.

The mold has been so shaped that the liquid copolymer plastic can enter with a minimal loss of heat into the cavity of the operative part of the mold where the liquid plastic fills completely the cavity, the shape of which corresponds to the mold. The operative part of the device is cooled by a reliable coolant which favors the cooling of the injected liquid plastic and in this way improves the operation of the device.

The production method of this invention makes it possible to better fill the cavity of the mold, which forms the operative part of the device, with liquid plastic flowing with linear flow characteristics.

The molten liquid copolymer plastic is injected with high speed into the operative part of the mold through a conically-shaped channel. At the outlet mouth of the channel the liquid copolymer plastic pushes onto the cumulative distribution member and divides along the whole circumference thereof and is uniformly introduced through an annular slit into the mold.

This annular slit, where the velocity of the flow of the copolymer plastic increases according to the slit diameter, causes a linear flow and uniform filling of the cavity of the mold. By means of this annular slit the copolymer plastic is introduced by means of linear flow without any turbulence, thereby resulting in a very strong and uniform shell casing and in its perfect shape.

BRIEF DESCRIPTION OF THE DRAWING

The nature of the invention and its advantages will appear more fully from the following detailed description taken in conjunction with the appended drawing, in which.

DETAILED DESCRIPTION

Figure 1:
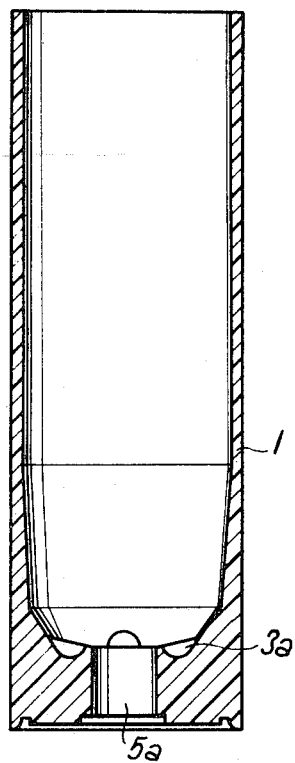
FIG. 1 is a cross-sectional elevation of the plastic shell casing in accordance with this invention shown together with an ignition cap mounted therein.

Referring now in more detail to the drawing, FIG. 1 illustrates a shell casing having a tubular body 1, the interior of which is substantially cylindrical in its upper portion 2 and changes in a downward direction into an intermediate tapered frustoconical portion 4 which ends in a bottom portion 3. The bottom portion 3 is provided with an axial opening 5 which is adapted to receive an ignition cap 5a. The bottom 3 of the shell casing has a plurality of intricate stiffening ribs 3a.

Figure 2:
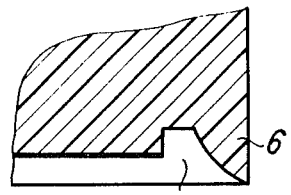
FIG. 2 is a detail on an enlarged scale which illustrates in a cross section the outer peripheral configuration of the bottom edge of the shell casing.
Figure 4:
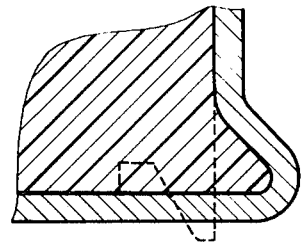
FIG. 4 is another detail in cross section on an enlarged scale which illustrates the bottom edge of the shell casing after the metal fitting has been pressed onto it.
Figure 3:
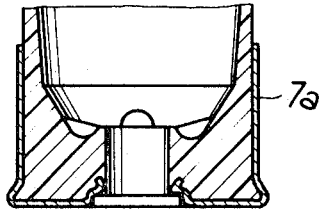
FIG. 3 is a partial cross-sectional view which illustrates the shape of the shell casing after a metal fitting has been pressed onto it.

The stiffening ribs 3a substantially contact each other around the periphery of the passage 5. These stiffening ribs 3a form a continuous wall around the passage 5 which prevents the gases from escaping when the ignition cap 5a has been ignited and simultaneously firmly retained the ignition cap 5a in a correct position inside the shell casing 1. The bottom 3, furthermore, has a special configuration which is best illustrated in FIG. 2 of the drawing. The bottom surface of the bottom 3 is formed with an annular groove 7, whereas the outer edge of the bottom surface of the bottom 3 is constituted by a dependent projection 6 which extends below the bottom surface. Thus, it can be noted that the annular groove 7 is disposed between the outer depending projection 6 and the central opening 5 of the shell casing. This construction, and in particular the annular groove 7, make it possible to perfectly position the metal fitting 7a (see FIG. 3) onto the plastic shell casing by pressing it thereon. When the metal fitting 7a is pressed onto the plastic shell casing 1, the depending projection 6 is bent upwardly at an angle of 90°. The annular groove 7 facilitates this bending step of the depending projection 6.

After this pressing step is completed, he the metal fitting 7a is flatly fitted onto the plastic shell casing by means of a well-known fitting machine, while at the same time a perfectly flat bottom surface is formed.

If the annular groove 7 would not be present in the bottom surface of the plastic shell casing 1, the deflection of the depending projection 6 would be made more difficult and the plastic material would also be subject to be damaged as, for example, being cracked. Furthermore, the plastic material would not uniformly extend into the mating portions of the metal fitting 7a so that some portions of the flange member of the metal fitting 7a would have more plastic material extend into them than other portions thereof.

Figure 6:
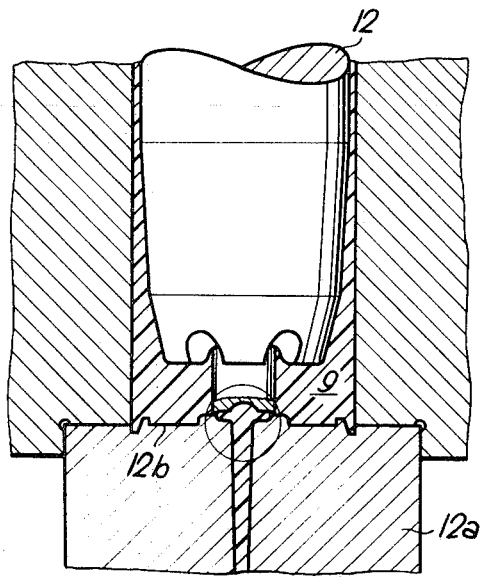
FIG. 6 is a schematic cross-sectional elevational view of the slit injection system for injecting the liquid plastic material into the mold for the plastic shell casing.
Figure 7:
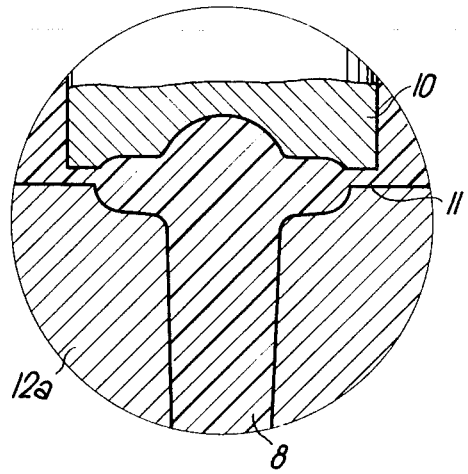
FIG. 7 is a detail in cross section on an enlarged scale of the cumulative distribution means for injecting the liquid plastic into the mold illustrated in FIG. 6.
Figure 5:
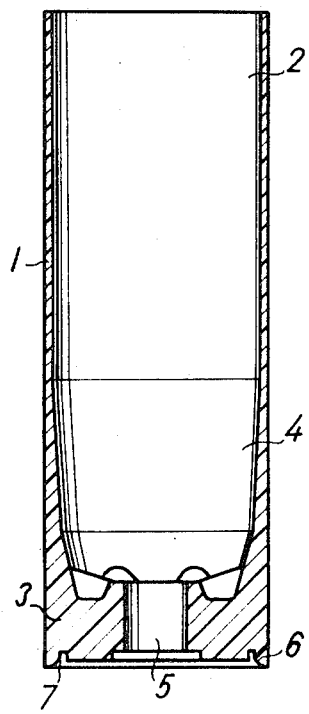
FIG. 5 is a cross-sectional elevation of the shell casing without an ignition cap mounted therein.

Referring now to the manufacturing method for producing the aforedescribed plastic shell casings, which constitutes an intermediate product in the manufacture of a cartridge, it should be noted that the invention utilizes a well-known injection molding technique for obtaining the special shape of the plastic shell casing 1 as illustrated in FIGS. 1 and 2. Thus, liquid polyethylene, polypropylene, and/or other suitable liquid plastic polymer materials are injected into the cavity 9 of the mold 12 illustrated in FIG. 5. Temperature conditions are maintained during this injection step which are sufficiently high for using the injection mold technique. A pressure range of 80 to 140 kilograms per centimeters square is preferably used in the injection molding step. The molds 12 may have the shape and configuration of any internationally recognized ammunition caliber. In order to fill the mold with liquid polymer plastic material by means of the injection molding technique, the liquid plastic material is injected by means of a vertical cumulative distribution member 10 (FIG. 7) via a circular slit 11 into the mold 12 at the bottom thereof, as illustrated in FIGS. 6 and 7. As can be noted from FIGS. 6 and 7, the cumulative distribution member 12a comprises a passage 8 through which flow of liquid plastic polymer material is effected. The cumulative distribution member 12a has a surface 12b which corresponds to the bottom surface of the shell casing. The liquid polymer plastic material is distributed to the distribution member 12a via the annular slit 11 thereby creating a flow having linear characteristics. Due to the linear flow of the liquid polymer plastic material into the cavity 9 of the mold the plastic material, when it has fully solidified will have increased strength sufficient to withstand the shear and tensional stresses that may occur between the bottom 3 and sidewalls of the shell casing during detonation. The bottom 3 of the shell casing can be formed with relatively thin walls due to the circular slit injection molding technique herein described and illustrated. The bottom 3 is furthermore formed with stiffening ribs 3a which strengthen the structure in the area of initial combustion during detonation. These stiffening ribs 3a increase the overall strength of the bottom 3 of the shell casing 1 and also serve to securely support the ignition cap 5a in position inside the shell casing. The mold 12 together with the distribution member 12a have the shape and configuration of any one of the internationally recognized ammunition calibers. The liquid polymer plastic material is injected into the mold 12 under a pressure range of preferably 80 to 140 kilograms per centimeter square.

The liquid plastic polymer material flows into the cavity 9 via the annular slit 11 from the passage defined in the cumulative distribution member 12a. As can be noted especially from FIG. 7, the passage 8 terminates in a cavity 10 which has a substantially spherical shape. From this cavity 10, the plastic polymer material flows uniformly in a radial direction to the annular slit 11 into the cavity 9 of the mold 12. The configuration of the flow passages 8, 10, 11, insure that the liquid plastic polymer material flows into the cavity 9 of the mold 12 at all times with linear flow characteristics, which insure that the shell casing 1, once the plastic material has hardened in the mold 12, has superior strength in a longitudinal as well as in a transverse direction. Thus, due to special configuration of the cumulative distribution unit 12a and specifically the configuration of the flow passages contained therein, the plastic shell casing is formed by means of an injection molding technique which the flow of the liquid polymer plastic material has at all times linear flow characteristics, turbulent flow not taking place at any time.

Although our invention has been illustrated and described with reference to the preferred embodiment of a shell casing and a method for manufacturing the same, we wish to have understood that it is in no way limited to the details of such a preferred embodiment but is capable of modifications within the scope of the appended claims.

We claim:

1. Apparatus for manufacturing integral plastic shell casings by injection molding, said shell casings having thin forward cylindrical sidewalls and a transverse rear end portion of thick section, comprising a mold having a cavity which has a shape substantially corresponding to the shape of said plastic shell casing, the mold having means defining the rear, transverse outer wall and the outer sidewalls of the mold cavity, first core means defining the inner sidewall of the mold cavity and the radially outer annular portion of the forward transverse inner wall of the cavity, a first passage through the rear part of the mold axially of the mold cavity, said first passage receiving plastic material injected thereinto under pressure, second core means which is disposed axially of the mold cavity and retained from axial movement by the first core, said second core having a rear transverse end surface confronting an annular zone of the rear wall of the mold cavity surrounding the forward end of the first passage, the rear end surface of the second core and the confronting rear wall of the mold cavity forming a second passage disposed normal to the first passage, said outlet means having curved walls and defining a complete annular slit through which the plastic material flows into the mold cavity.

2. Apparatus according to claim 1, wherein the means defining the rear, transverse outer wall of the mold cavity has an annular groove therein, said annular groove when filled with plastic material injected into the mold forming a rim projecting rearwardly from the rear end of the shell casing.